(12) United States Patent
Horikoshi

(10) Patent No.: US 6,661,932 B2
(45) Date of Patent: *Dec. 9, 2003

(54) IMAGE INPUT APPARATUS

(75) Inventor: Hiroki Horikoshi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/617,090

(22) Filed: Mar. 18, 1996

(65) Prior Publication Data

US 2002/0044701 A1 Apr. 18, 2002

(30) Foreign Application Priority Data

Mar. 20, 1995 (JP) ............................... 7-061123

(51) Int. Cl.⁷ .............................. G06K 9/36
(52) U.S. Cl. ...................... 382/284; 382/317
(58) Field of Search ............... 382/317, 299, 382/284; 348/219, 229; 358/450, 291

(56) References Cited

U.S. PATENT DOCUMENTS

| | | | | |
|---|---|---|---|---|
| 4,920,418 A | * | 4/1990 | Robinson | 358/213.28 |
| 5,386,228 A | * | 1/1995 | Okino | 348/229 |
| 5,402,171 A | * | 3/1995 | Tagami | 348/219 |
| 5,469,274 A | * | 11/1995 | Iwasaki et al. | 382/294 |
| 5,481,375 A | * | 1/1996 | Eto et al. | 358/450 |
| 5,581,377 A | * | 12/1996 | Shimizu et al. | 358/540 |
| 5,696,848 A | * | 12/1997 | Patti et al. | 382/254 |
| 5,721,624 A | * | 2/1998 | Kumashiro et al. | 382/284 |
| 5,745,664 A | * | 4/1998 | Nomura et al. | 395/117 |
| 6,205,259 B1 | * | 3/2001 | Komiya et al. | 382/284 |

* cited by examiner

Primary Examiner—Yon J. Couso
(74) Attorney, Agent, or Firm—Fitzpatrick, Cella, Harper & Scinto

(57) ABSTRACT

An image input apparatus reliably detects occurrence of an error in the receiving of a plurality of image signals for obtaining a high-resolution still image, and prevents time loss caused by meaningless processing in a later stage of processing. By performing pixel shifting control of a lens unit by a lens control unit, a plurality of image signals are produced from an image of an object by an image pickup unit, and are stored in a memory unit. Thereafter, the lens unit is returned to its original position. A calculation unit compares an image signal produced again at that time with the image signal stored in the memory unit, and an invalidity determination unit determines validity/invalidity of the stored image signals. When it has been determined that the stored image signals are invalid, the data stored in the memory unit is cancelled. A plurality of image signals are reinput from the image pickup unit and are stored in the memory unit.

27 Claims, 7 Drawing Sheets

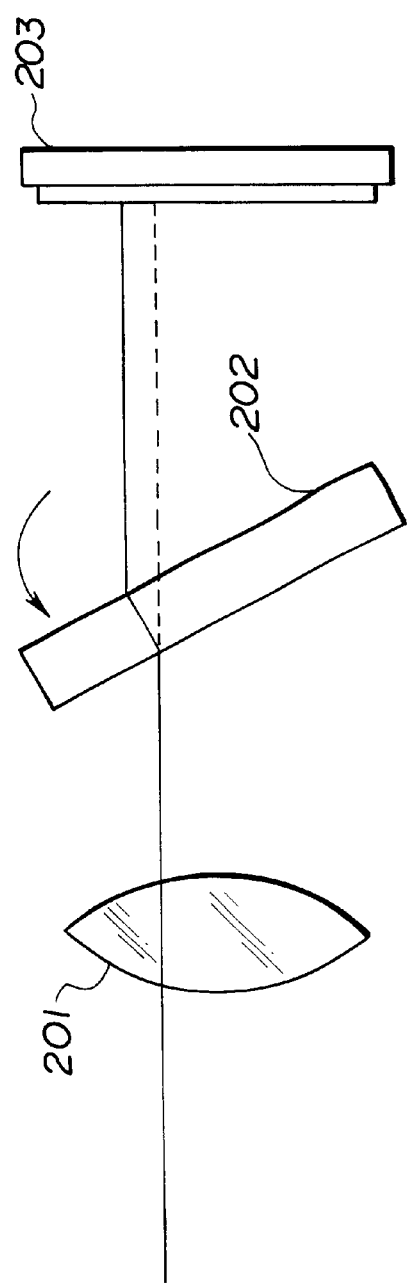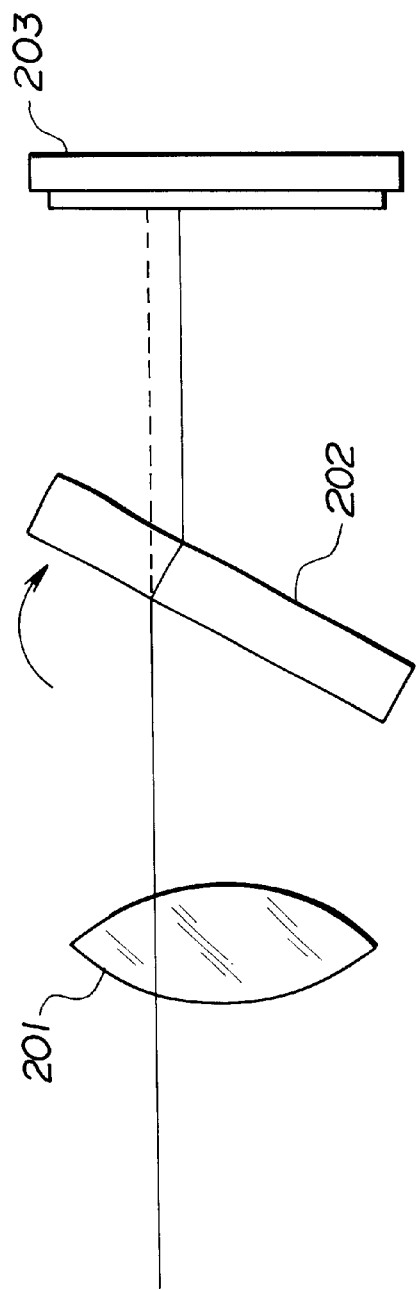

FIG.4(a)

| 0 | 1 | 0 | 1 | 0 | 1 | 0 | 1 |
|---|---|---|---|---|---|---|---|
| 3 | 2 | 3 | 2 | 3 | 2 | 3 | 2 |
| 0 | 1 | 0 | 1 | 0 | 1 | 0 | 1 |
| 3 | 2 | 3 | 2 | 3 | 2 | 3 | 2 |
| 0 | 1 | 0 | 1 | 0 | 1 | 0 | 1 |
| 3 | 2 | 3 | 2 | 3 | 2 | 3 | 2 |
| 0 | 1 | 0 | 1 | 0 | 1 | 0 | 1 |
| 3 | 2 | 3 | 2 | 3 | 2 | 3 | 2 |

FIG.4(b)

| 0 | 0 | 0 | 0 | 1 | 1 | 1 | 1 |
|---|---|---|---|---|---|---|---|
| 0 | 0 | 0 | 0 | 1 | 1 | 1 | 1 |
| 0 | 0 | 0 | 0 | 1 | 1 | 1 | 1 |
| 0 | 0 | 0 | 0 | 1 | 1 | 1 | 1 |
| 3 | 3 | 3 | 3 | 2 | 2 | 2 | 2 |
| 3 | 3 | 3 | 3 | 2 | 2 | 2 | 2 |
| 3 | 3 | 3 | 3 | 2 | 2 | 2 | 2 |
| 3 | 3 | 3 | 3 | 2 | 2 | 2 | 2 |

FIG.5

| 0 | 0 | 0 | 0 |
|---|---|---|---|
| 0 | 0 | 0 | 0 |
| 0 | 0 | 0 | 0 |
| 0 | 0 | 0 | 0 |

FRAME #0

| 1 | 1 | 1 | 1 |
|---|---|---|---|
| 1 | 1 | 1 | 1 |
| 1 | 1 | 1 | 1 |
| 1 | 1 | 1 | 1 |

FRAME #1

| 2 | 2 | 2 | 2 |
|---|---|---|---|
| 2 | 2 | 2 | 2 |
| 2 | 2 | 2 | 2 |
| 2 | 2 | 2 | 2 |

FRAME #2

| 3 | 3 | 3 | 3 |
|---|---|---|---|
| 3 | 3 | 3 | 3 |
| 3 | 3 | 3 | 3 |
| 3 | 3 | 3 | 3 |

FRAME #3

IMAGE INPUT APPARATUS

BACKGROUND OF THE INVENTION

1. Field of the Invention

This invention relates to an image input apparatus for inputting image information, and more particularly, to an image input apparatus in which a single high-resolution still image is obtained by inputting and synthesizing a plurality of images.

2. Description of the Related Art

Recently, in accordance with the advent of high-performance or multimedia-type personal computers, multi-color or high-resolution monitors, and the like, there is an increasing demand for inputting high-resolution still images, such as documents, color drawings, photographs, and the like.

Although scanners have been widely used as means for inputting high-resolution still images, a number of disadvantages of scanners have been pointed out. For example, a great deal of time is required for scanners to receive data, and only plane images can be input. Accordingly, high-resolution cameras have recently been proposed in which various means are used instead of scanners.

Particular attention has been paid to cameras in which a high-resolution still image is input using a standard-resolution image input device. Such a standard-resolution image input device comprises a solid-state image pickup device, such as a CCD (charge-coupled device) or the like, having about four-hundred-thousand effective pixels. However, the resolution of such a device is insufficient for dealing with high-definition still images.

In order to deal with high-resolution still images using an image input apparatus including a standard-resolution image pickup device, a method (a pixel shifting method) has been proposed in which, for example, as shown in FIGS. 4(a) and 5, a plurality (four in this example) of image signals #0–#3 are obtained by shifting the optical axis of an image pickup element, comprising, for example, 4×4 pixels, in units of a fraction of a pixel (in units of a ½-pixel pitch in this example) in the horizontal and vertical directions, and these image signals are synthesized.

Another method (a picture-frame dividing method) has also been proposed in which, as shown in FIGS. 4(b) and 5, a plurality of image signals #0–#3 are obtained by dividing an image into a plurality of areas both in the vertical and the horizontal directions, and the image signals are synthesized to provide one picture frame by connecting borders of the sub-divided areas. In the pixel shifting method, a flat plane having parallel surfaces or a variable prism is generally used.

Next, an image input apparatus which can input a high-resolution image according to the above-described pixel shifting method will be briefly described with reference to FIG. 6.

FIG. 6 is a block diagram illustrating the configuration of an image input apparatus which can perform pixel shifting control. In this case, optical-axis shifting control in units of a ½-pixel pitch is performed. In FIG. 6, a lens unit 701 has a function of changing the optical axis of the apparatus. Reference numeral 702 represents an image pickup unit. An image processing unit 703 performs various kinds of filtering processing. A memory unit 704 temporarily stores input image information. A memory input control unit 705 controls an input operation to the memory unit 704. A memory output control unit 706 controls an output operation from the memory unit 704. A lens control unit 707 controls the movement of the optical axis of the lens unit 701. An overall control unit 708 monitors the states of the respective other units, and controls operations and timings of the entire apparatus.

Next, the operation of the image input apparatus will be described. Before inputting an image, the lens unit 701 is controlled so that its optical axis is moved by the lens control unit 707. The memory input control unit 705 controls storage regions of the memory unit 704. First, input control of a still image is performed for an origin (a home position) in which pixel shifting is not performed in either the horizontal or vertical direction. An image signal input via the lens unit 701, the image pickup unit 702 and the image processing unit 703 is stored in a predetermined region of the memory unit 704 under the control of the memory input control unit 705. Thereafter, three additional image signals are input in the following sequence: a position is obtained by shifting the optical axis by a ½-pixel pitch only in the horizontal direction, another position is obtained by shifting the optical axis by a ½-pixel pitch both in the horizontal and vertical directions, and still another position obtained by shifting the optical axis by a ½-pixel pitch only in the vertical direction (see FIG. 7). In the processing of inputting and storing the images, the memory input control unit 705 controls storage positions corresponding to respective image pickup positions. Four-frame pixel-shifting images, as shown in FIG. 5, obtained in the above-described processing are synthesized, and the obtained image is stored in the memory unit 704.

As result of the above-described processing, an image having a larger number of pixels than the number of pixels of a single solid-state image pickup device, i.e., a still image having higher resolution, is produced. In an image input apparatus which performs the above-described pixel shifting control, a great deal of time is required to input and store a plurality of image signals obtained by shifting pixels in fine units. For example, in order to input a high-resolution image obtained by shifting pixels in units of a ½-pixel pitch in the above-described manner, several hundred milliseconds to several seconds is usually required.

However, in the above-described image input apparatus, a high-resolution still image cannot be correctly obtained if all image information cannot be normally input during a time period from the start of input of the first image signal to the completion of input of the last image signal due to various factors, such as the movement of the object to be input, vibration in the original mount or the main body of the apparatus, the interposition of a view-blocking obstacle, a noticeable change in illumination, or the like.

Since the above-described image input apparatus does not have means for detecting such an error in image pickup processing, it is impossible to detect if a normal high-resolution still image has been input. Accordingly, the user can confirm validity of image pickup operation only by visually confirming an actual image, for example, by displaying the obtained high-resolution still image on a monitor or printing the image. As a result, meaningless processing time is utilized, and reliability in image input operation is compromised.

SUMMARY OF THE INVENTION

The present invention has been made in consideration of the above-described problems.

It is an object of the present invention to provide an image input apparatus which can detect an incorrectly performed operation of receiving a high-resolution still image caused by predetermined factors, and which can determine invalidity of the obtained image information.

According to one aspect, the present invention which achieves the above-described object relates to an image input apparatus comprising image input means for converting an image of an object into an electrical image signal, storage means for storing a plurality of image signals input from the image input means, high-resolution signal forming means for forming a high-resolution signal by synthesizing the plurality of image signals stored in the storage means, comparison means for comparing the plurality of image signals with one another, and control means for controlling the formation of the high-resolution signal in the high-resolution signal forming means in accordance with an output of the comparison means.

Since the high-resolution signal is obtained by synthesizing the plurality of image signals, high-resolution image information can be obtained. Since the plurality of image signals are compared with one another and the formation of the high-resolution signal is controlled in accordance with the result of the comparison, it is possible to confirm easily if the plurality of image signals have been correctly input.

In one embodiment, the plurality of image signals stored in the storage means are cancelled in response to an output of the control means.

Since the plurality of stored image signals are cancelled in response to the output of the control means, unnecessary information need not be stored.

In another embodiment, a plurality of image signals are again input from the image input means and are stored in the storage means in response to an output of the control means.

Since the plurality of image signals can be reinput in response to the output of the control means, processing can be performed promptly when a plurality of image signals are invalid.

In still another embodiment, the image input means inputs a plurality of image signals obtained by shifting the optical axis of light from the object by a predetermined small unit (say, 1/n pixel, where n is a natural number) in at least one arbitrary direction and, if desired, in a direction perpendicular thereto.

Accordingly, images can be input according to a so-called pixel shifting method or a so-called picture-frame dividing method.

In yet another embodiment, the image input means comprises an image pickup device for performing photoelectric conversion of the light from the object imaged onto a photosensing surface thereof via a lens, a flat plate made of a light-transmitting material provided on the optical axis so that its angle of inclination is variable, and position control means for controlling an imaging position of the light from the object by changing the angle of inclination of the flat plate.

Accordingly, when using the pixel shifting method, a plurality of image signals can be easily extracted.

In yet a further embodiment, the image input means inputs a plurality of image signals obtained by dividing the picture frame of an image in an arbitrary direction and, if desired, in a direction perpendicular thereto.

The foregoing and other objects, advantages and features of the present invention will become more apparent from the following detailed description of the preferred embodiment taken in conjunction with the accompanying drawings.

BRIEF DESCRIPTION OF THE DRAWINGS

FIGS. 2(a) and 2(b) are diagrams illustrating the control of the movement of the optical axis of the image input apparatus shown in FIG. 1;

FIGS. 4(a) and 4(b) are diagrams each illustrating a method of inputting a plurality of image signals;

FIG. 5 comprises diagrams illustrating four image signals input from the images shown in FIGS. 4(a) and 4(b);

DETAILED DESCRIPTION OF THE PREFERRED EMBODIMENT

A preferred embodiment of the present invention will now be described with reference to the drawings.

Figure 1:
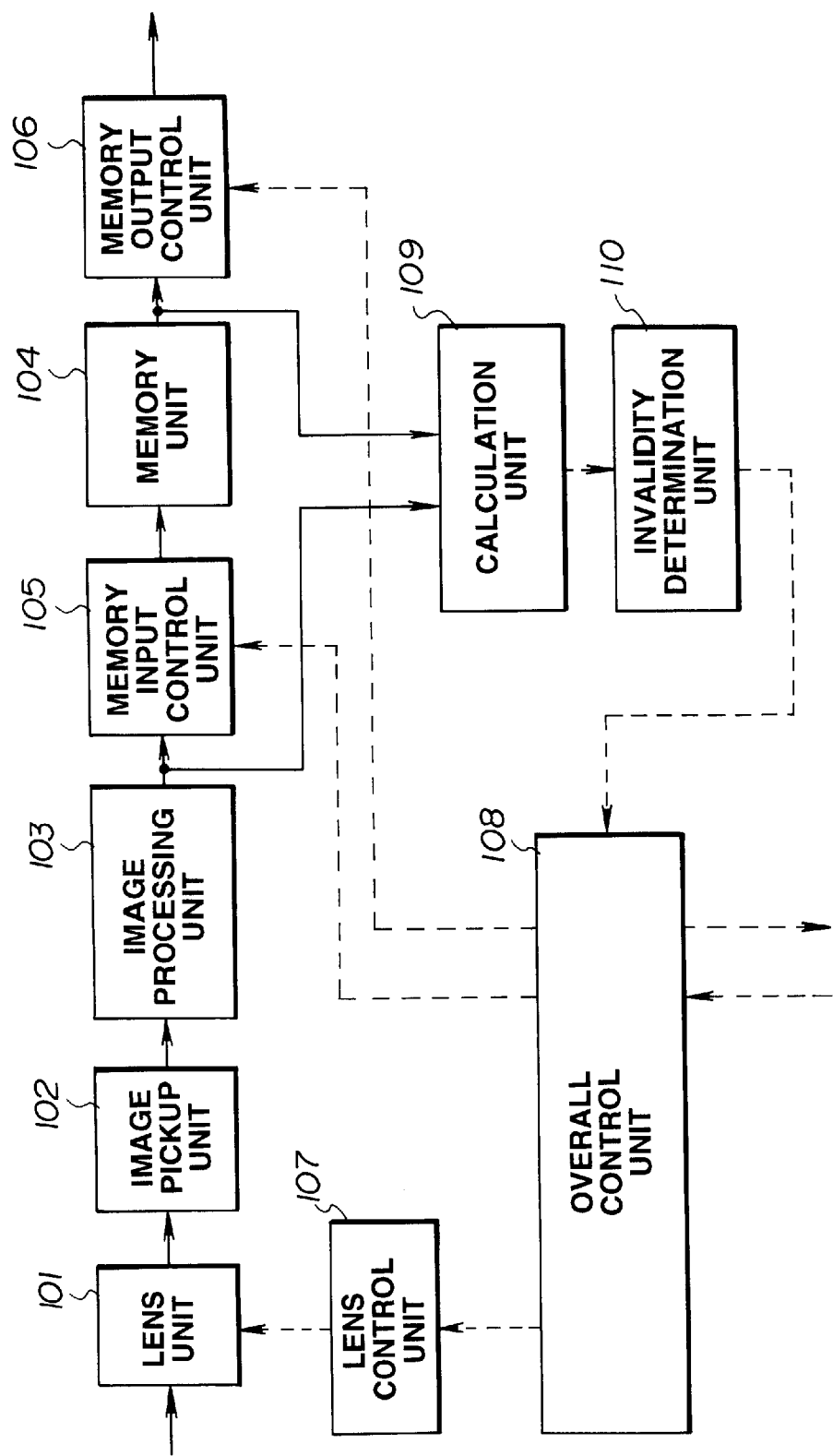
FIG. 1 is a schematic block diagram illustrating the configuration of an image input apparatus according to an embodiment of the present invention.

FIG. 1 is a block diagram illustrating the entire configuration of an image input apparatus according to the embodiment. In FIG. 1, a lens unit 101 has a function of changing the optical axis of the apparatus. An image pickup unit 102 comprises a CCD or the like. An image processing unit 103 performs various kinds of filtering processing. A memory unit 104 serves as storage means for temporarily storing input image information. A memory input control unit 105 controls inputting to the memory unit 104. A memory output control unit 106 controls outputting from the memory unit 104. A lens control unit 107 controls the movement of the optical axis of the lens unit 101. An overall control unit 108 monitors the states of the respective other units, and controls operations and timings of the entire apparatus. The lens unit 101, the image pickup unit 102 and the lens control unit 107 constitute image input means, and the memory input control unit 105 and the memory unit 104 constitute high-resolution-signal forming means.

A calculation unit 109 evaluates the difference between an input image represented by the output of the image processing unit 103 and a predetermined image stored in the memory unit 104. An invalidity determination unit 110 determines validity/invalidity of a high-resolution image provided in the memory unit 104 in accordance with the result of the evaluation of the calculation unit 109, and notifies the overall control unit 108 of invalidity of the image. The operations of the calculation unit 109 and the invalidity determination unit 110 are described in detail below. The calculation unit 109 and the invalidity determination unit 110 constitute comparison means, and the overall control unit 108 constitutes control means.

Next, a description will be provided of basic processing to store a high-resolution image in the image input apparatus of this embodiment. The image input apparatus of this embodiment can control input by shifting pixels by a ½-pixel pitch in at least one of the horizontal and vertical directions. Image information of an object at positions corresponding to respective image pickup positions, as shown in FIG. 5, is stored in the memory unit 104, and a high definition still image is provided in the memory unit 104.

Figure 7:
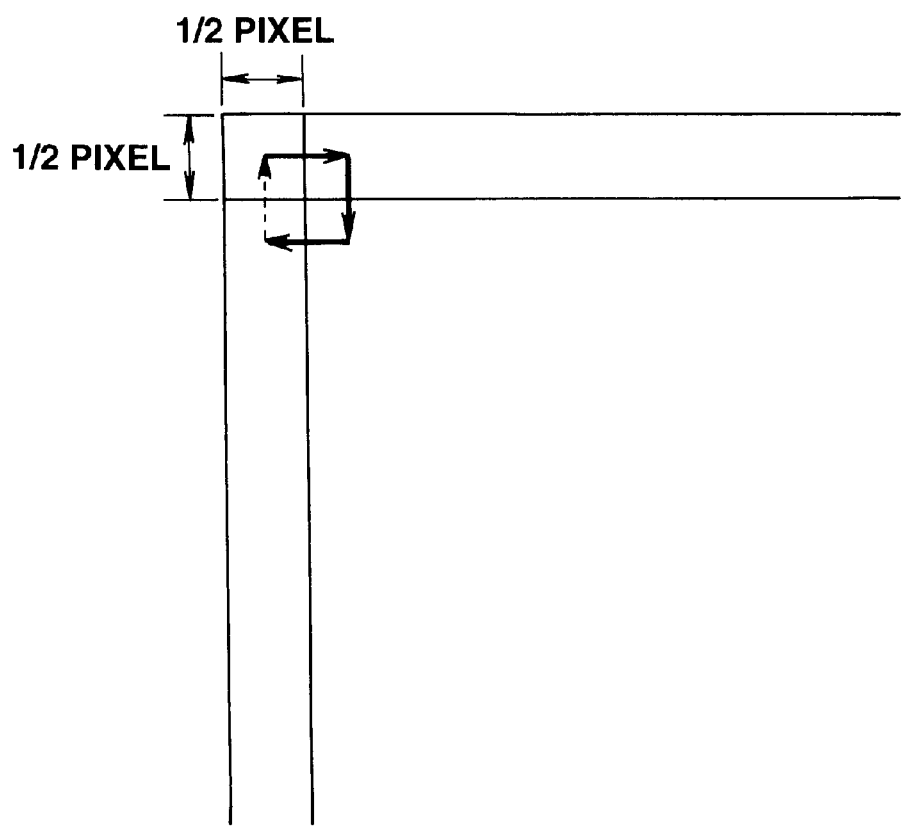
FIG. 7 is a diagram illustrating the sequence of input of images corresponding to FIG. 4(a) according to a pixel shifting method.

The operation of the image input apparatus shown in FIG. 1 will now be described. Before inputting an image, the lens unit 101 is controlled so that its optical axis is moved by the lens control unit 107. The memory input control unit 105 controls storage regions of the memory unit 104. First, input control of a still image of an object is performed for an origin (a home position) in which pixel shifting is not performed either in the horizontal or vertical direction. Image information input via the lens unit 101, the image pickup unit 102 and the image processing unit 103 is stored in a predetermined region of the memory unit 104 under the control of the memory input control unit 105. Thereafter, images of the object are sequentially input corresponding to a position obtained by shifting the optical axis by a ½-pixel pitch in only the horizontal direction, a position obtained by shifting the optical axis by a ½-pixel pitch both in the horizontal and the vertical directions, and a position obtained by shifting the optical axis by a ½-pixel pitch in only the vertical direction (see FIG. 7). During the processing of inputting and storing of the images, the memory input control unit 105 controls storage positions corresponding to respective image pickup positions. Four-frame pixel-shifting images, as shown in FIG. 5, obtained in the above-described processing are synthesized, and the resulting image is stored in the memory unit 104.

Information corresponding to the high-resolution still image stored in the memory unit 104 is output from the memory output control unit 106 in response to an output request from outside the apparatus. Upon completion of storage of the image information in the memory unit 104, the optical axis of the lens unit 101 is returned to the origin position (home position), in which pixels are not shifted in either the horizontal or vertical direction, under the control of the lens control unit 107.

In the present embodiment, according to the above-described processing, an image having a larger number of pixels than the number of pixels of a single solid-state image pickup device, i.e., a high-resolution still image, is received.

Next, a description will be provided of the control and processing for moving the optical axis relating to the lens unit 101, the image pickup device 102 and the lens control unit 107, with reference to FIGS. 1 through 2(b).

In FIGS. 2(a) and 2(b), a lens 201 and a flat plate 202 having parallel surfaces made of a light-transmitting material situated therebehind constitute the lens unit 101 shown in FIG. 1. The flat plate 202 can change its angle of inclination with respect to the optical axis which passes through the lens 201. A solid-state image pickup device 203, such as a CCD or the like, constituting the image pickup unit 102 shown in FIG. 1 is disposed behind the flat plate 202. The lens control unit 107 shown in FIG. 1 can move the imaging position of light passing through the flat plate 202 on the solid-state image pickup device 203 by controlling the inclination of the flat plate 202 with respect to the optical axis, as shown in FIGS. 2(a) and 2(b), so that information of a plurality of images having different imaging positions can be easily input. In the present embodiment, by shifting the optical axis by a ½-pixel pitch in at least one of the horizontal and vertical directions, and inputting image signals representing four frames obtained from the origin position, by shifting the optical axis by a ½-pixel pitch in the horizontal direction, by a ½-pixel pitch in the vertical direction, and by a ½-pixel pitch both in the horizontal and vertical directions, an image whose resolution is twice the pixel density (resolution) both in the horizontal and vertical directions can be obtained.

Next, a description will be provided of processing for determining validity/invalidity for received high-resolution-still-picture information in the image input apparatus of the present embodiment.

As described above, according to the control of the movement of the optical axis by the lens control unit 107, image signals representing four images, comprising an origin image, an image obtained by shifting the optical axis by a ½-pixel pitch in the horizontal direction, an image obtained by shifting the optical axis by a ½-pixel pitch in the vertical direction, and an image obtained by shifting the optical axis by a ½-pixel pitch in both the horizontal and the vertical directions, are sequentially stored in the memory unit 104 shown in FIG. 1. Upon completion of the storage, the lens unit 101 is returned to the origin position under the control of the lens control unit 107. An image signal representing the origin position is again transmitted to the calculation unit 109 via the lens unit 101, the image pickup unit 102 and the image processing unit 103. The calculation unit 109 evaluates the difference between the reinput image signal from the origin and the image signal from the origin stored in the memory unit 104, and outputs the result of the evaluation to the invalidity determination unit 110. More specifically, the sum of the absolute values of the differences between pixels present at the same position is output.

The invalidity determination unit 110 compares the sum of the absolute values of the differences input as the result of the evaluation with a predetermined threshold, determines the stored high-resolution still image signal, comprising image signals representing four picture frames, to be invalid when the sum of the absolute values of the differences is greater than the threshold, and notifies the overall control unit 108 of such invalidity. Upon reception of the invalidity notification from the invalidity determination unit 110, the overall control unit 108 sends a notification outside the apparatus that the stored high-resolution still image is invalid, and executes a control operation to reinput the image. It is thereby determined that some error has occurred while the image signals representing four frames constituting the high-resolution still image were being input and stored, and the stored image information is processed as invalid information. By thus reading the image signal corresponding to the origin from the memory unit 104, it is possible to perform calculation evaluation using two kinds of information having the longest time interval therebetween, and to increase reliability in the determination of invalidity.

Figure 3:
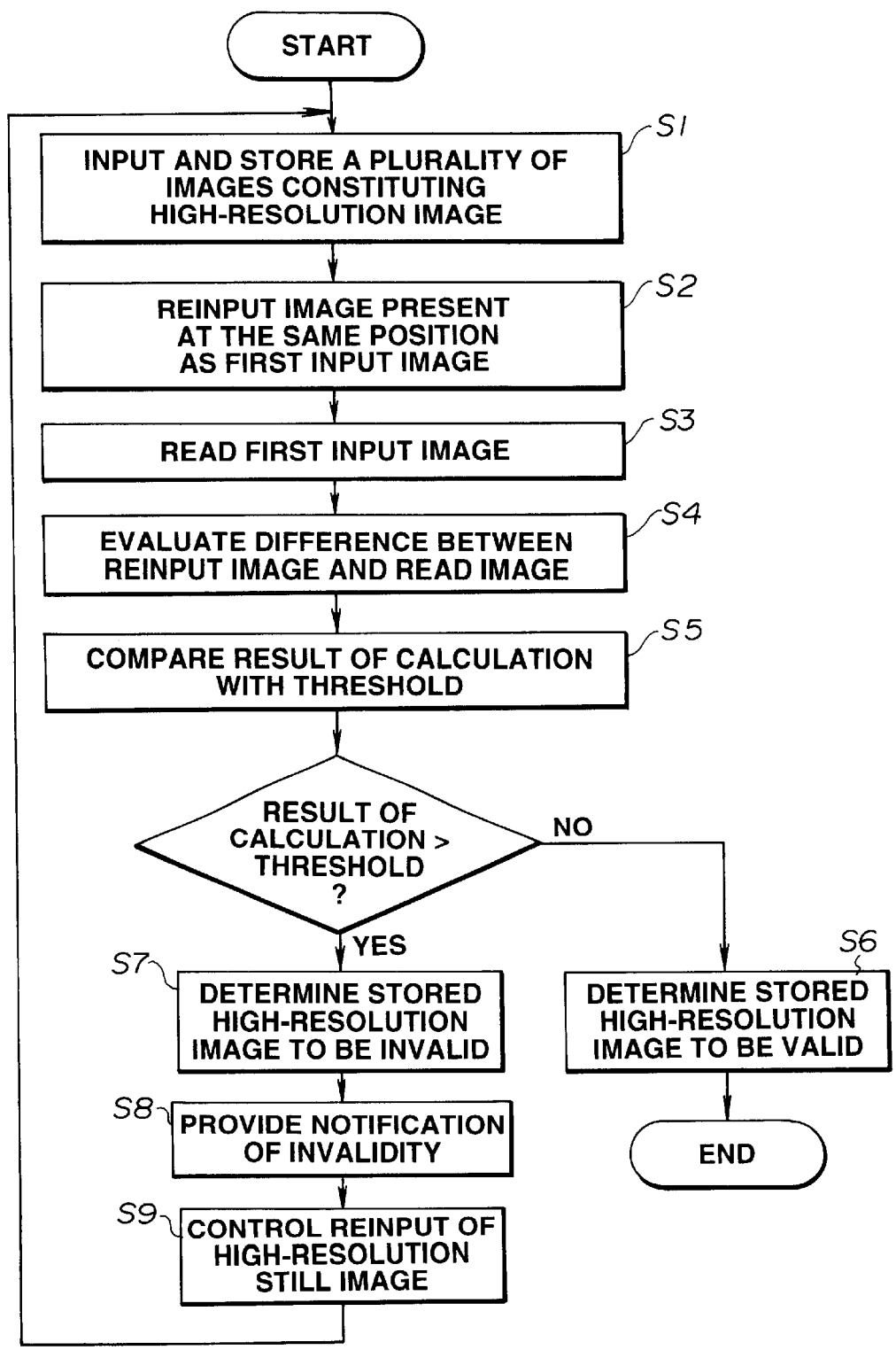
FIG. 3 is a flowchart illustrating an image input method in the image input apparatus shown in FIG. 1.
Figure 6:
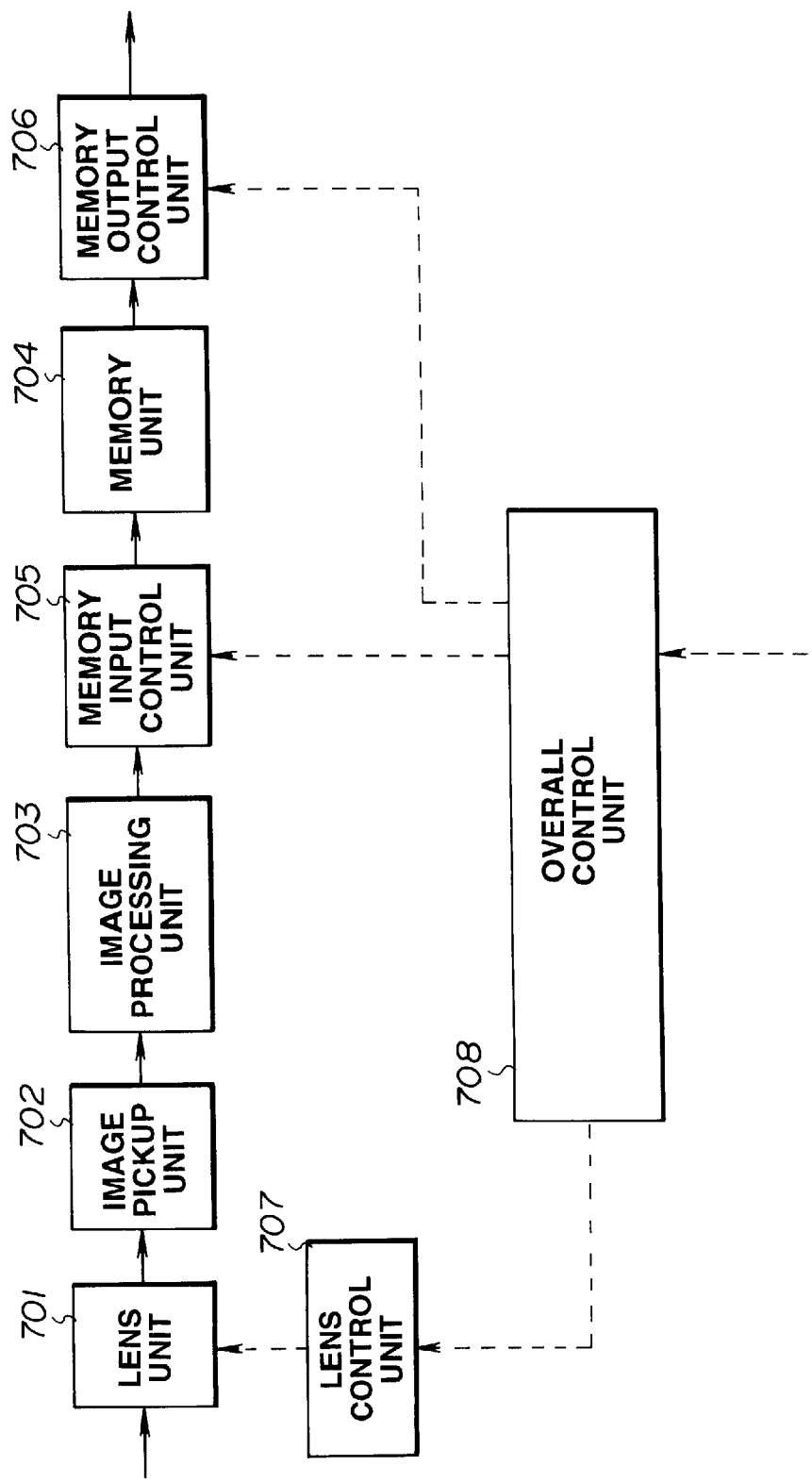
FIG. 6 is a schematic block diagram illustrating the configuration of a conventional image input apparatus.

Next, a description will be provided of procedures for inputting images in the image input apparatus of the embodiment with reference to the flowchart shown in FIG. 3.

First, in step S1, a plurality of images for providing a high-resolution image signal are input and stored.

Then, in step S2, an image signal is reinput at the initial input position. In step S3, the image signal which has been first stored is read from the memory unit 4. In step S4, a calculation is executed with respect to the reinput image signal and the stored image signal based on a predetermined evaluation function, for example, a calcuation for obtaining the sum of the absolute values of the differences between the two image signals. In step S5, the result of the calculation is compared with a predetermined threshold.

When the result of the calculation is equal to or smaller than the threshold, it is determined in step S6 that the stored high-resolution image signal is valid. When the result of the calculation is greater than the threshold, it is determined in step S7 that the stored high-resolution image signal is invalid.

When it has been determined in step S7 that the stored high-resolution still image signal is invalid, in step S8, a notification of the result of the determination is sent to outside of the apparatus. In step S9, control for executing processing of again inputting and storing four image signals constituting a high-resolution still image signal is performed.

According to the above-described approach, the occurrence of some difficulty, such as the movement of an object to be input, vibration in the original mount or the main body of the apparatus, imposition of a view-blocking obstacle within the image pickup region, a change in illuminance, or the like, while the four image signals constituting the high-resolution image signal are being input, can be detected, and invalidity of the stored high-resolution still image signal determined. It is thereby possible to prevent transfer of an abnormal image signal and consequent wasted processing time in later stages of processing, and to increase reliability in the input of image information.

That is, the image input apparatus of the present embodiment is configured so as to produce a higher-resolution image signal by synthesizing image signals representing four picture frames. Upon completion of storage of the image signals representing the four picture frames, an image signal representing an image present at the same position as the image represented by the stored image signal is reinput. The stored image signal is compared with the reinput image signal, and validity/invalidity of the stored high-resolution still image provided by the four image signals is determined in accordance with the result of the comparison. An incorrect still image is determined to be invalid, and control for reinputting the images is performed. It is thereby possible consistently and assuredly to input a high-resolution still image signal.

In the present embodiment, a description has been provided of the case in which a high-resolution still image signal is input by synthesizing image signals representing four images obtained by shifting the optical axis by a ½-pixel pitch in at least one of the horizontal and vertical directions. However, the present invention is not limited to the case of shifting the optical axis by a ½-pixel pitch, but may also be applied using various amounts of pixel shifting, such as a ⅓-pixel pitch, a ¼-pixel pitch or the like. Moreover, the amount of shifting (the number of divided areas) may differ in the horizontal direction and the vertical direction.

Although in the present embodiment a description has been provided of the method of shifting pixels using a transparent flat plate having parallel surfaces, the present invention may also be applied to a method using a prism or to any other pixel shifting method.

The image input apparatus of the present embodiment inputs a high-resolution still image according to a pixel shifting method. However, the present invention is not limited to such an approach, but may also be applied to a picture-frame dividing method in which, as shown in FIG. 4(b), a high-resolution still image is provided by dividing the picture frame of an image into a plurality of areas and connecting the divided areas. The number of divided areas is not limited to four, but an arbitrary number may be adopted. An image input apparatus according to the present invention may input a high-resolution still image according to a method in which the pixel shifting method is combined with the picture-frame dividing method. Furthermore, all or part of the functions of the image input apparatus of the present invention may be realized by software.

According to the present invention, since a high-resolution image signal is composed by synthesizing a plurality of image signals, high-resolution image information can be obtained. Furthermore, since a plurality of image signals are compared with one another, and the formation of a high-resolution image signal is controlled in accordance with the result of the comparison, it is possible easily to confirm if a plurality of image signals have been correctly input. Accordingly, meaningless processing time is not taken up in later stages of processing, and reliability in an image input operation can be improved.

What is claimed is:

1. An image input apparatus comprising:
    an image input unit adapted to input a plurality of images from an object;
    a synthesizing unit adapted to synthesize said plurality of images inputted into said image input unit, to form a synthesized image;
    a detecting unit adapted to detect at least one of a movement of the object, vibration in an original mount or a main body of the apparatus, an interposition of a view blocking obstacle, and a temporal change in luminance of the same portion in the object, and determine a validity or invalidity of said plurality of images for synthesis into a synthesized image, in accordance with a detection result; and
    a control unit adapted to control said plurality of images not to be synthesized, when determined to be invalid, and to control said plurality of images to be synthesized, when determined to be valid,
    wherein said control unit causes a plurality of images to be re-input from said image input unit and stores the re-input images in a storage unit in accordance with the detection result.

2. An image input apparatus comprising:
    an image input unit adapted to input a plurality of images from an object;
    a synthesizing unit adapted to synthesize said plurality of images inputted into said image input unit, to form a synthesized image;
    a detecting unit adapted to detect at least one of a movement of the object, vibration in an original mount or a main body of the apparatus, an interposition of a view blocking obstacle, and a temporal change in luminance of the same portion in the object, and determine a validity or invalidity of said plurality of images for synthesis into a synthesized image, in accordance with a detection result; and
    a control unit adapted to control said plurality of images not to be synthesized, when determined to be invalid, and to control said plurality of images to be synthesized, when determined to be valid,
    wherein said detecting unit determines invalidity when the change is larger than a predetermined value, and
    wherein said control unit causes the plurality of images to be re-input from said input unit and stored in a storage unit when said detecting unit determines invalidity.

3. An image input apparatus comprising:
    an image input unit adapted to input a plurality of images from an object;
    a synthesizing unit adapted to synthesize said plurality of images inputted into said image input unit, to form a synthesized image;
    a detecting unit adapted to detect at least one of a movement of the object and a temporal change in luminance of a portion of the object, and to determine a validity or invalidity of said plurality of images for synthesis into a synthesized image based on the detected movement of the object and/or the detected temporal change in luminance of a portion of the object; and
    a control unit adapted to control said plurality of images not to be synthesized, when determined to be invalid, and to control said plurality of images to be synthesized, when determined to be valid.

4. An image input apparatus according to claim 1, wherein said control unit cancels said plurality of images stored in a storage unit in accordance with the detection result.

5. An image input apparatus according to claim 3 or 4, wherein said image input unit inputs a plurality of images obtained by dividing the picture frame of an image in at least one of an arbitrary direction and a direction perpendicular thereto.

6. An image input apparatus according to claim 3, wherein said image input unit inputs a plurality of images obtained by shifting the optical axis of light from the object in at least one of an arbitrary direction and a direction perpendicular to the arbitrary direction.

7. An image input apparatus according to claim 6, wherein said image input unit comprises:

an image pickup device for performing photoelectric conversion of the light from the object which has been imaged onto a photosensing surface thereof via a lens;

a flat plate made of a light-transmitting material provided on the optical axis so that its angle of inclination is variable; and position control unit adapted to control an imaging position of the light from the object by changing the angle of inclination of said flat plate.

8. An image processing apparatus according to claim 3, wherein said detecting unit determines invalidity when the detected movement of the object and/or the detected temporal change in luminance of a portion of the object is larger than a predetermined value.

9. An image processing apparatus according to claim 3, wherein said detecting unit determines validity when the detected movement of the object and/or the detected temporal change in luminance of a portion of the object is smaller than a predetermined value.

10. An image processing apparatus according to claim 8, wherein said control unit cancels said plurality of image signals in a storage unit when said detecting unit determines invalidity.

11. An image input apparatus according to claim 3, wherein said control unit cancels said plurality of images stored in a memory unit when said plurality of images are determined to be invalid.

12. An image input apparatus according to claim 3, wherein said plurality of images are obtained by shifting a lens of the image input unit in at least one of an arbitrary direction and a direction perpendicular thereto.

13. An image input apparatus according to claim 3, wherein said plurality of images are obtained by dividing signals in at least one of an arbitrary direction and a direction perpendicular thereto.

14. An image input apparatus according to claim 3, wherein said plurality of images input from said image input unit include a plurality of images picked up at different positions, and said detecting unit obtains the detection result by comparing each of the images among the plurality of images at a same position.

15. A method of processing signals comprising the steps of:

inputting a plurality of images from an object;

synthesizing said plurality of images inputted in said input step into a synthesized image;

detecting at least one of a movement of the object and a temporal change in the luminance of a portion of the object, and determining validity or invalidity of said plurality of images for synthesis into a synthesized image based on the detected movement of the object and/or the detected temporal change in luminance of a portion of the object; and controlling said plurality of images not to be synthesized, when determined to be invalid, and controlling said plurality of images to be synthesized, when determined to be valid.

16. A method according to claim 15, where said determining step includes canceling said plurality of images from a storage unit when said images are determined to be invalid.

17. A method according to claim 15, wherein said image inputting step includes inputting the images by shifting a lens of an image input unit in at least one of an arbitrary direction and a direction perpendicular thereto.

18. A method according to claim 15, wherein said image inputting step includes inputting the images by dividing signals in at least one of an arbitrary direction and a direction perpendicular thereto.

19. A method according claim 15, wherein said image inputting step includes inputting a plurality of image signals picked up at different positions, and wherein said detecting step includes comparing each of the image signals among the plurality of signals at a same position.

20. A computer-readable medium for storing a program to process signals, the program being executable by a processor controlled image processing apparatus to perform a method comprising the steps of:

inputting a plurality of images from an object;

synthesizing said plurality of images inputted in said inputting step to form a synthesized image;

detecting at least one of a movement of the object and a temporal change in luminance of a portion of the object, and determining validity or invalidity of said plurality of images for synthesis into a synthesized image based on the detected movement of the object and/or the detected temporal change in luminance of a portion of the object; and controlling said plurality of images not to be synthesized, when determined to be invalid, and controlling said plurality of images to be synthesized, when determined to be valid.

21. A computer-readable medium according to claim 20, wherein said determining step includes canceling said plurality of images from a storage unit when determined to be invalid.

22. A computer-readable medium according to claim 20, wherein said image inputting step includes inputting the images by shifting a lens of an image input unit in at least one of an arbitrary direction and a direction perpendicular thereto.

23. A computer-readable medium according to claim 20, wherein said image inputting step includes inputting the images by dividing signals in at least one of an arbitrary direction and a direction perpendicular thereto.

24. A computer-readable medium according to claim 20, wherein said image inputting step includes inputting a plurality of image signals picked up at different positions, and wherein said detecting step includes comparing each of the image signals among the plurality of signals at a same position.

25. An image input apparatus according to claim 3, wherein said detecting unit performs detection by comparing a plurality of images inputted from said image input unit at different times.

26. A method according to claim 15, wherein said detecting step includes performing detection by comparing a plurality of images inputted in said image inputting step at different times.

27. A computer-readable medium according to claim 20, wherein said detecting step includes performing detection by comparing a plurality of images inputted in said image inputting step at different times.

* * * * *

UNITED STATES PATENT AND TRADEMARK OFFICE
CERTIFICATE OF CORRECTION

PATENT NO. : 6,661,932 B2
DATED : December 9, 2003
INVENTOR(S) : Hiroki Korikioshi It is certified that error appears in the above-identified patent and that said Letters Patent is hereby corrected as shown below:

Column 3,
Line 8, "high-resolution signal" should read -- high-resolution-signal --.

Column 6,
Line 50, "calcuation" should read -- calculation --.

Column 10,
Line 12, "where" should read -- wherein --.
Line 24, "according" should read -- according to --.

Signed and Sealed this

Twentieth Day of July, 2004

JON W. DUDAS
*Acting Director of the United States Patent and Trademark Office*